(No Model.)
S. COPELAND.
COMBINED GAGE AND DIVIDERS.
No. 363,600. Patented May 24, 1887.
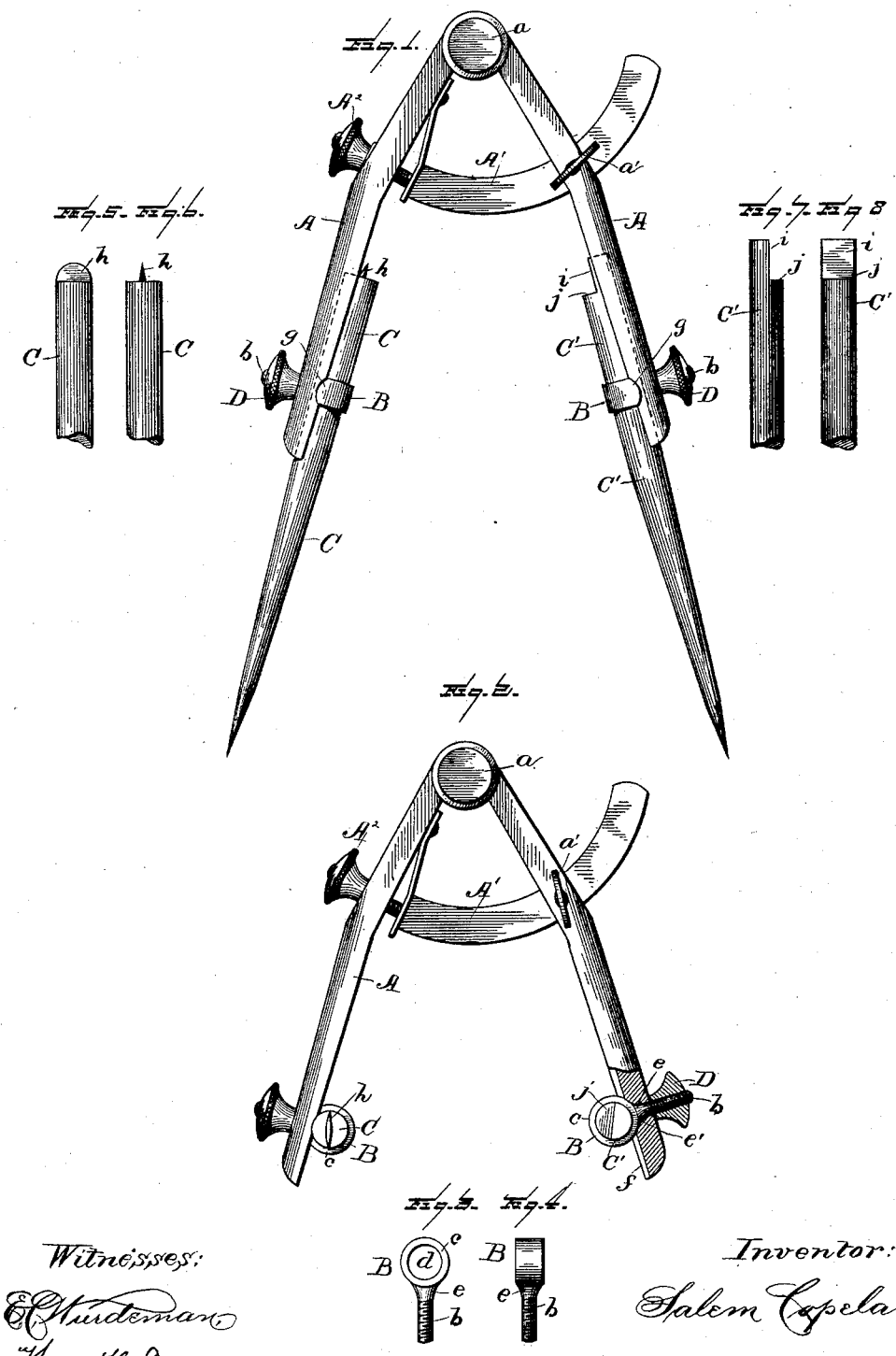
Witnesses:
Inventor: Salem Copeland

UNITED STATES PATENT OFFICE.

SALEM COPELAND, OF WORCESTER, MASSACHUSETTS.

COMBINED GAGE AND DIVIDERS.

SPECIFICATION forming part of Letters Patent No. 363,600, dated May 24, 1887.

Application filed February 14, 1887. Serial No. 227,644. (No model.)

*To all whom it may concern:*

Be it known that I, SALEM COPELAND, of the city and county of Worcester, and Commonwealth of Massachusetts, have invented a certain new and useful Combined Gage and Dividers; and I do hereby declare that the following is a full and clear description of the same, reference being had to the accompanying drawings, forming a part of this specification, and in which—

Figure 1 represents a side view of the dividers. Fig. 2 represents a side view of the device when arranged for use as a gage, a part of one of the supporting-arms being shown in section, as will be hereinafter fully described. Figs. 3 and 4 represent edge and side views, respectively, of one of the holding and adjusting loop-screws, as will be hereinafter more fully described. Figs. 5 and 6 represent, respectively, side and edge views of the rear and gage end of the divider-arm C, as will be hereinafter described; and Figs. 7 and 8 represent the rear and gage end of the divider-arm C', as will be hereinafter described.

To enable those skilled in the art to which my invention belongs to make and use the same, I will proceed to describe the combined device more in detail.

In the drawings, the parts marked A A are the supporting-arms, which turn on a common pivot, $a$, while said arms are held in any desired adjusted position by means of the guide-arm A', adjusting-nut A², set-screw $a'$, and spring $a^2$, all in the usual manner. The inner sides of supporting-arms A A are hollowed or concaved out to receive the round ends of the divider points or fingers C C', (see dotted and full lines, Figs. 1 and 2,) the extreme rear end of finger C (see Figs. 5, 6) being made with a thin curved edge, $h$, (a side view being shown in Fig. 5 and edge view, Fig. 6,) while the rear end of finger C' is made with a square shoulder, $j$, and a flat guide-finger, $i$, as fully shown in Figs. 7 and 8. The arms A A, in addition to being made concaved lengthwise to receive the round shanks of the fingers C and C', are also made with cross grooves or concaves $g$, the lowest points of the concaves $g$ being in line with the center of the hole in arm A, through which the screw-points $b$ of the loop-screws B pass, as fully shown in the drawings.

The loop parts $c$ have round holes or openings $d$, to receive the ends of fingers C C', while the base or bottom part, $e$, of each loop $c$ is made conical in shape to fit a corresponding conical depression or hole, $e'$, in the inner face or side of its respective arm A. Nuts D D hold the screw-loops B B in their adjusted positions, as fully indicated in Figs. 1 and 2 of the drawings.

By making the shanks $e$ of loops $c$ conical they fit closely down into the conical holes $e'$ in the inner faces of the supporting-arms A. Consequently the fingers or divider-points C C' when passed through their respective loops $c$ $c$, and nuts D D turned down tight, they will fit closely in the grooves $f$, and be held there in a secure manner when arranged for use, as shown in Fig. 1, for describing circles. Then, again, by loosening nuts D D the fingers or dividers C and C' can be turned at right angles to their supporting-arms A A, as shown in Fig. 2, and then, as nuts D D are turned down again, fingers C C' are drawn down into the grooves or concaves $g$ in the inner edges of the supporting-arms A A, where they will be securely held for use as a gage on boards, leather, or other material, the operation in this case being as follows: The operator takes hold of the device, and by placing the shoulder $j$ on the piece of board and the flat side of finger $i$ against the edge of the board, with the knife-edge $h$ resting on the board, moves the device along over the board, when a gage-mark parallel with the edge of the board will be made. By setting the finger C up or down to bring its knife-edge $h$ a greater or less distance below the shoulder $j$, a deep or shallow cut or mark can be made, as desired. Then, again, by reversing the ends of finger C, when finger C' is in the position shown in Fig. 1, the device may be used to cut washers, packings, or round veneers of any desired size, by simply setting the parts C and C' a greater or less distance apart, the knife-edge $h$ serving as a cutter to sever the leather or other material as said cutter is turned about the point of divider-finger C'.

From the above description it will be seen that my said combined device is made to answer a threefold purpose, and that, too, without materially adding to the expense.

It will be noticed that by making the bases $e$ of loops $c$ of loop-screws B conical, with conical openings or holes $e'$ in their supporting-arms, the fingers C and C' can be held equally secure in either of the adjusted positions above described. Then, again, the loop-screws B, in combination with the arms A A, having conical holes or openings $e'$ to receive the conical parts $e$ of loop-screws B, can be very conveniently used to hold caliper arms or fingers, the same as the fingers C C' are held in Fig. 2, thereby enabling the operator to use the parts A A and B B for this purpose also.

Having described my combined device, what I claim therein as new and of my invention, and desire to secure by Letters Patent, is—

1. The combination, with the supporting-arms A A, of fingers C C', provided on their rear ends with knife-edge $h$ and shoulder $j$ and finger $i$, respectively, substantially as and for the purposes set forth.

2. The combination, with the supporting-arms A A, provided with grooves $f$, concaves $g$, and conical holes $e'$, of screw-loops B, the loops $c$ of which are provided with conical bases $e$, and fingers C C', provided with knife-edge $h$ and shoulder $j$ and finger $i$, respectively, substantially as and for the purposes set forth.

SALEM COPELAND.

Witnesses:
 THOS. H. DODGE,
 TIMOTHY DUGGAN.